(12) United States Patent
Mueller et al.

(10) Patent No.: US 10,205,145 B2
(45) Date of Patent: Feb. 12, 2019

(54) ENERGY STORAGE ARRANGEMENT AND MOUNTING DEVICE

(71) Applicant: Bayerische Motoren Werke Aktiengesellschaft, Munich (DE)

(72) Inventors: Dominic Mueller, Freising (DE); Marc Ulbrich, Munich (DE); Martin Korn, Jetzendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 492 days.

(21) Appl. No.: 14/682,899

(22) Filed: Apr. 9, 2015

(65) Prior Publication Data

US 2015/0214523 A1 Jul. 30, 2015

Related U.S. Application Data

(63) Continuation of application No. PCT/EP2013/069204, filed on Sep. 17, 2013.

(30) Foreign Application Priority Data

Oct. 10, 2012 (DE) .................. 10 2012 218 473

(51) Int. Cl.
*H01M 2/10* (2006.01)
*H01M 10/65* (2014.01)
(Continued)

(52) U.S. Cl.
CPC ....... *H01M 2/1077* (2013.01); *B60L 11/1877* (2013.01); *H01M 2/1072* (2013.01);
(Continued)

(58) Field of Classification Search
None
See application file for complete search history.

(56) References Cited

U.S. PATENT DOCUMENTS

| 4,973,335 A | 11/1990 | Rose et al. |
| 2003/0003350 A1 | 1/2003 | Heimer et al. |
| (Continued) | | |

FOREIGN PATENT DOCUMENTS

| CN | 101061598 A | 10/2007 |
| CN | 102117930 A | 7/2011 |
| (Continued) | | |

OTHER PUBLICATIONS

Chinese Office Action issued in Chinese counterpart application No. 201380043663.5 dated May 27, 2016, with English translation (Fourteen (14) pages).

(Continued)

*Primary Examiner* — Daniel S Gatewood
(74) *Attorney, Agent, or Firm* — Crowell & Moring LLP

(57) ABSTRACT

An energy storage arrangement for supplying a voltage, in particular of a motor vehicle, includes a housing having a first plane and a second plane lying above the first plane, at least one first energy storage module in the first plane, at least one second energy storage module in the second plane, and an intermediate shelf which is fixed to the housing and supports the second energy storage module, wherein each energy storage module comprises two end plates and a plurality of storage cells clamped between the end plates.

15 Claims, 4 Drawing Sheets

(51) Int. Cl.
  *H01M 10/655* (2014.01)
  *H01M 10/6554* (2014.01)
  *H01M 10/6555* (2014.01)
  *H01M 10/613* (2014.01)
  *H01M 10/647* (2014.01)
  *H01M 10/625* (2014.01)
  *B60L 11/18* (2006.01)
  *H01M 10/04* (2006.01)

(52) U.S. Cl.
  CPC ..... *H01M 10/0404* (2013.01); *H01M 10/613* (2015.04); *H01M 10/625* (2015.04); *H01M 10/647* (2015.04); *H01M 10/655* (2015.04); *H01M 10/6554* (2015.04); *H01M 10/6555* (2015.04); *H01M 2220/20* (2013.01); *Y02T 10/7005* (2013.01); *Y02T 10/705* (2013.01)

(56) References Cited

U.S. PATENT DOCUMENTS

| | | |
|---|---|---|
| 2006/0152906 A1 | 7/2006 | Miller |
| 2007/0178369 A1 | 8/2007 | Conrardy et al. |
| 2007/0266553 A1 * | 11/2007 | Schlogl ............... B22D 25/04 29/623.1 |
| 2011/0151311 A1 | 6/2011 | Lee et al. |

FOREIGN PATENT DOCUMENTS

| | | | | |
|---|---|---|---|---|
| DE | 38 22 462 | C1 | 11/1989 | |
| DE | 3822462 | C1 * | 11/1989 | ............. H01M 2/20 |
| DE | 100 03 247 | A1 | 8/2000 | |
| DE | 100 64 648 | A1 | 7/2001 | |
| EP | 1 261 047 | A2 | 11/2002 | |
| EP | 2 339 664 | A1 | 6/2011 | |
| EP | 2 341 569 | A1 | 7/2011 | |
| EP | 2341569 | A1 * | 7/2011 | .......... H01M 2/1077 |
| FR | 2963484 | A1 * | 2/2012 | .......... H01M 2/1077 |
| JP | 2009-238643 | A | 10/2009 | |
| JP | 2009238643 | A * | 10/2009 | |
| WO | WO 2006/053353 | A2 | 5/2006 | |

OTHER PUBLICATIONS

International Search Report dated May 15, 2014 (Four (4) pages).
German Search Report dated Jul. 4, 2013 with Statement of Relevancy (Six (6) pages).

\* cited by examiner

ENERGY STORAGE ARRANGEMENT AND MOUNTING DEVICE

CROSS REFERENCE TO RELATED APPLICATIONS

This application is a continuation of PCT International Application No. PCT/EP2013/069204, filed Sep. 17, 2013, which claims priority under 35 U.S.C. § 119 from German Patent Application No. 10 2012 218 473.2, filed Oct. 10, 2012, the entire disclosures of which are herein expressly incorporated by reference.

BACKGROUND AND SUMMARY OF THE INVENTION

The present invention relates to an energy storage arrangement for supplying a voltage, in particular of a motor vehicle, and an assembly apparatus for the energy storage arrangement.

The energy storage arrangement serves to combine a plurality of energy storage modules in a common housing. The energy storage arrangement can also be referred to as a battery. The arrangement is used for supplying a voltage of a motor vehicle and, for this purpose, comprises a plurality of energy storage modules. In particular, the energy storage arrangement is used for the vehicle drive, for example of electric vehicles or of hybrid vehicles. A particular energy storage module typically consists of a plurality of stacked prismatic storage cells. The stack of individual storage cells is usually clamped to the energy storage module by means of a mechanical end plate and tension anchor. As well as mechanically fixing the modules to one another, the end plates and tension anchors serve in particular to counteract a deformation due to changes in gas pressure which occur during operation in the electrochemical cells arranged in the interior of the modules.

It is the object of the present invention to specify an energy storage arrangement for supplying a voltage, in particular of a motor vehicle, which enables a flexible and modular arrangement of a plurality of energy storage modules in a housing while being inexpensive to manufacture and assemble. Furthermore, the energy storage arrangement must be both operationally and crash-safe. In addition, the object of the invention includes the provision of an assembly apparatus for assembling the energy storage arrangement.

The object is achieved by the independent claims. Advantageous developments of the invention are the subject matter of the dependent claims.

The object is therefore achieved by an energy storage arrangement for supplying a voltage, in particular of a motor vehicle, comprising a housing having at least two planes arranged above one another. Energy storage modules are arranged in both planes. The energy storage modules in the first plane are referred to as "first energy storage modules". The modules in the second plane are referred to as "second energy storage modules". Each energy storage module has two end plates and a plurality of storage cells clamped between the end plates. In particular, the storage cells are connected to one another by means of tension anchors. According to the invention, the second energy storage modules, which are located in the second plane of the housing, are supported by an intermediate shelf. The at least one intermediate shelf is a separate component which is inserted into the housing. The intermediate shelf not only separates the energy storage modules of the different planes, but also serves as a primary supporting element for the second energy storage modules. The use of the intermediate shelf therefore enables a very simple assembly process, as the energy storage modules can be inserted into the housing one after the other from the top. Furthermore, the intermediate shelf stiffens the housing and provides a very rigid contact area for the second energy storage modules, thus providing both operational safety and crash safety. According to the invention, more than two planes can of course also be provided above one another in the housing. In doing so, at least one intermediate shelf is in each case inserted between two planes.

Preferably, it is provided that the at least one second energy storage module is connected to the housing only by means of the intermediate shelf. The intermediate shelf is therefore the only component supporting the second energy storage module.

The intermediate shelf preferably rests on recesses, projections or contact areas of the housing. Particularly preferably, the intermediate shelf is screwed to the housing. In particular, a separate intermediate shelf is provided for every second energy storage module. In doing so, each intermediate shelf is preferably connected to the housing at four screw points.

The end plates of the second energy storage module preferably rest on the intermediate shelf. In particular, the end plates are screwed directly to the intermediate shelves. When a plurality of second energy storage modules is arranged in the second plane and an intermediate shelf is provided for every second energy storage module, exactly two end plates rest on each intermediate shelf at the opposite ends.

A cooling device is preferably arranged between the intermediate shelf and the at least one second energy storage module. In particular, this cooling device comprises a cooling rib element. The cooling device must rest as closely as possible and flat against the underside of the second energy storage module in order to dissipate the heat effectively.

When a plurality of second energy storage modules is arranged in the second plane, it is preferably provided that an intermediate shelf is used for every second energy storage module. However, advantageously, the cooling device extends over a plurality of second energy storage modules. In particular, only one common cooling device, in particular with one common cooling rib element, is provided for all second energy storage modules.

Preferably, the intermediate shelves press the cooling device against the underside of the second energy storage module. The cooling capacity is increased by an appropriately high contact force of the cooling device against the underside of the second energy storage module.

The intermediate shelf is preferably made of plastic, die cast aluminum or cast magnesium, in the form of a pressed and folded part or in the form of a continuously cast/extruded profile.

The inventive energy storage arrangement enables the loading of the bottommost housing base to be reduced, as the force is introduced into the walls of the housing via the intermediate shelves. Furthermore, the intermediate shelves act as bridges between the housing walls and thereby stiffen the whole housing.

The modular design by using a plurality of energy storage modules and a separate intermediate shelf for every second energy storage module enables a kit to be provided for designing widely differing energy storage arrangements.

Furthermore, the invention includes an assembly apparatus for inserting the intermediate shelves in the housing of the energy storage arrangement. In order to save costs, the housing of the energy storage arrangement is as far as possible used as a raw casting without further machining. However, this has the consequence that the tolerances for positioning the energy storage modules and the intermediate shelves in the housing are relatively large. Particularly when a plurality of second energy storage modules and therefore also a plurality of intermediate shelves are arranged, it is especially important that the intermediate shelves lie exactly parallel to one another. Only in this way can it be guaranteed that the common cooling device is pressed uniformly and flat against the underside of the second energy storage modules. For these reasons, the following assembly apparatus is provided: The assembly apparatus comprises at least two holders. Mountings are formed on each holder. The mountings are used to fix an intermediate shelf. One intermediate shelf is fixed on each holder. The two holders are connected to one another in such a way that they can only be moved relative to one another in a first direction. The mountings on the respective holders are designed such that they can only be moved relative to the holder in a second direction. The first direction is perpendicular to the second direction.

In order to design an energy storage arrangement with two intermediate shelves, a third holder is preferably provided. In doing so, the three holders are connected to one another in one plane. The connection between the holders only allows a movement in the first direction in each case. Mountings are in turn provided on the third holder in order to fix an intermediate shelf to the third holder. The mountings on the third holder also only allow a movement of the intermediate shelf or of the mountings relative to the third holder in the second direction.

With the inventive assembly apparatus, the intermediate shelves are aligned exactly parallel to one another and can be positioned parallel to one another in the housing relatively independently of the manufacturing accuracy of the housing. In order to connect the intermediate shelves to the mountings on the holders, use is made in particular of a hole in the intermediate shelf which is used in the later assembly process for connecting to the end plates or to the cooling device.

Further details, characteristics and advantages of the invention can be seen from the following description and the figures. In the drawings:

Other objects, advantages and novel features of the present invention will become apparent from the following detailed description of one or more preferred embodiments when considered in conjunction with the accompanying drawings.

DETAILED DESCRIPTION OF THE DRAWINGS

An exemplary embodiment of an energy storage arrangement 1 is described below with reference to FIGS. 1 to 5.

Figure 1:
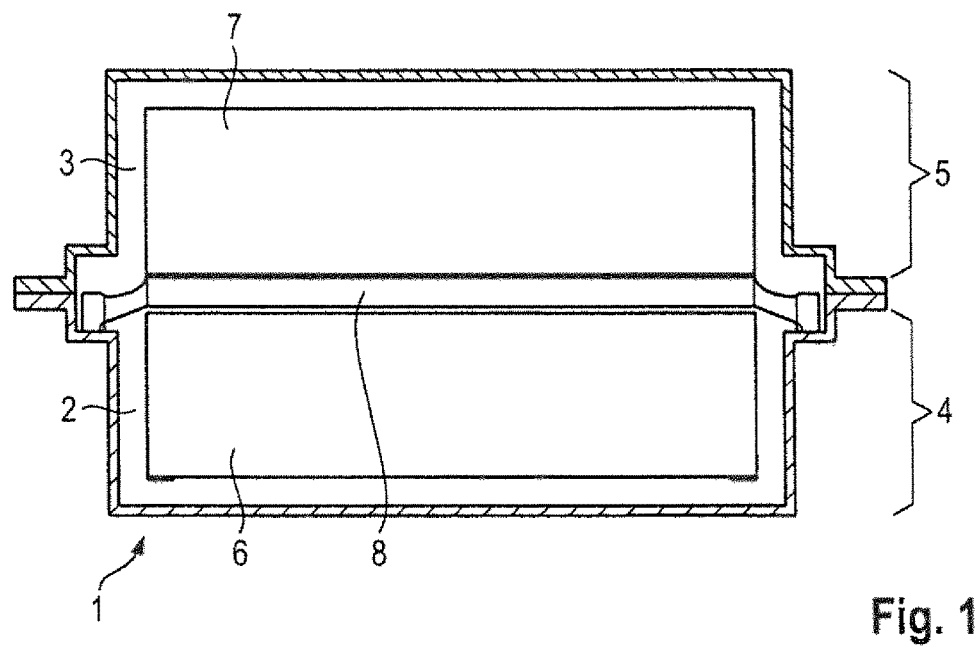
FIG. 1 shows a side section of an inventive energy storage arrangement according to an exemplary embodiment.

FIG. 1 shows a section through the energy storage arrangement 1. The energy storage arrangement 1 comprises a housing 2. This housing 2 is fitted in a motor vehicle for example. The housing 2 is sealed by means of a cover 3.

Furthermore, the housing 2 is subdivided into a first plane 4 and a second plane 5 arranged above the first plane 4. A plurality of first energy storage modules 6 is located in the first plane 4. A plurality of second energy storage modules 7 is located in the second plane 5. An intermediate shelf 8 is inserted between the two planes 4, 5 for every second energy storage module 7. The intermediate shelf 8 rests on the housing 2 and is connected to the housing 2. Each intermediate shelf 8 supports a second energy storage module 7.

Figure 2:
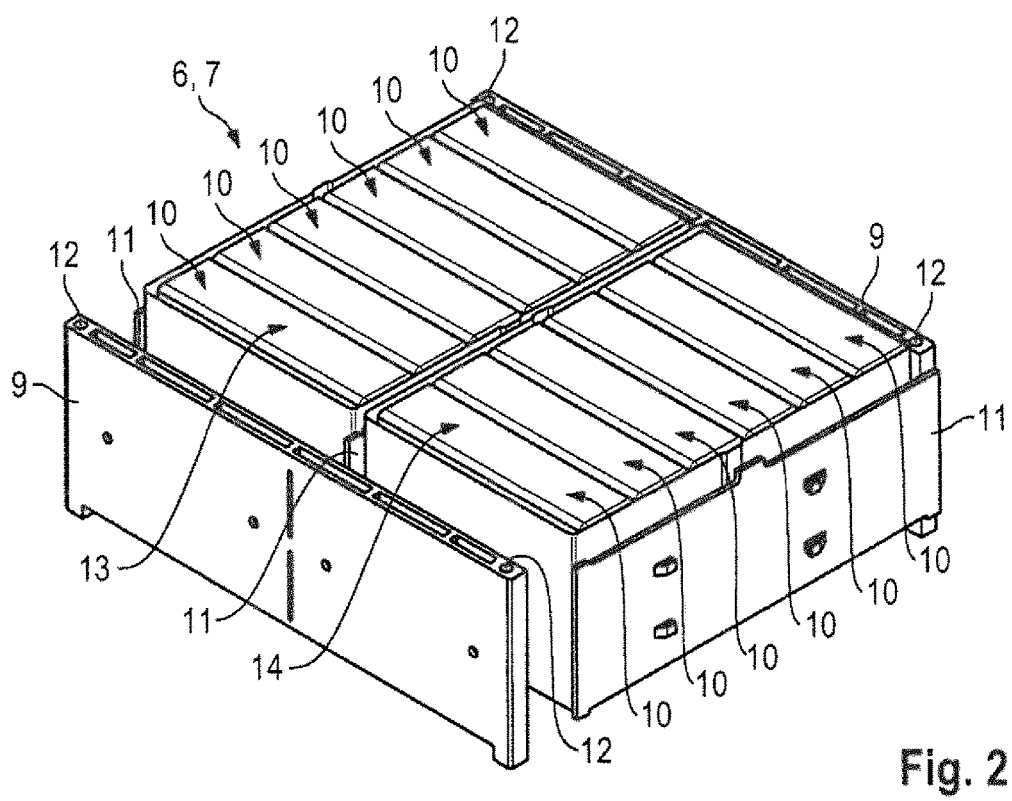
FIG. 2 shows an energy storage module of the inventive energy storage arrangement according to the exemplary embodiment.

FIG. 2 shows the construction of the energy storage modules 6, 7. In the energy storage arrangement 1, the first and second energy storage modules 6, 7 have the same construction.

The energy storage module 6, 7 comprises two parallel end plates 9. A plurality of prismatic storage cells 10 are arranged successively between the end plates 9. The two end plates 9 are clamped to one another by means of three tension anchors 11 such that an internal pressure which builds up in the storage cells 10 is retained by the end plates 9. The diagram in FIG. 2 shows two parallel rows 13, 14, each of six storage cells 10. It is also equally possible to arrange only one row of storage cells 10 between the end plates 9. Accordingly, the middle tension anchor 11 would then be omitted.

Furthermore, FIG. 2 shows two through-holes 12 in each end plate 9. These through-holes 12 are used for screwing the end plate 9 to the housing 2 or to the intermediate shelf 8.

Figure 3:
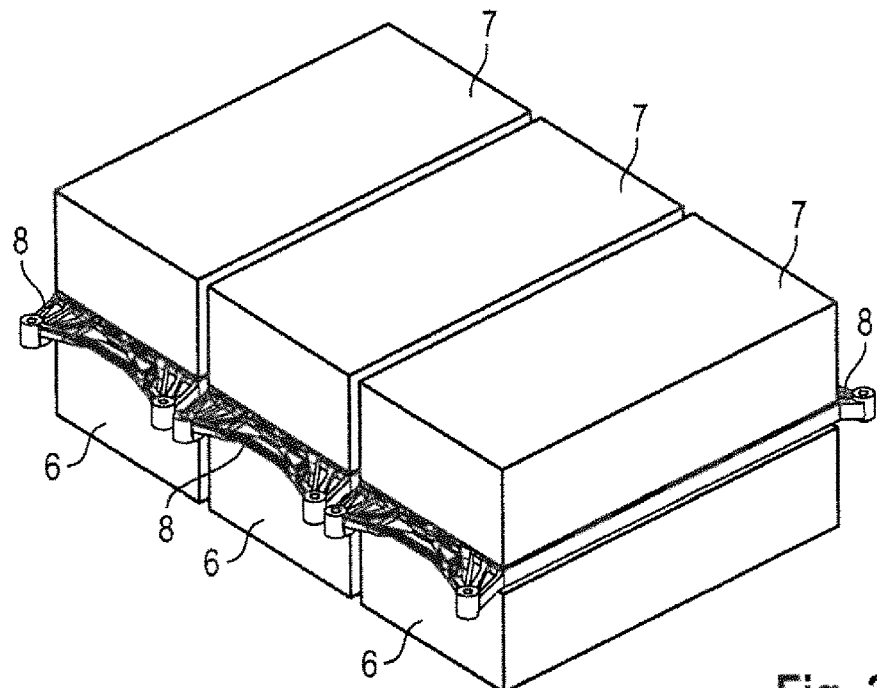
FIG. 3 shows a first detail of the inventive energy storage arrangement according to the exemplary embodiment.

FIG. 3 shows the energy storage arrangement 1, wherein the housing 2 has been omitted. This enables it to be seen that three energy storage modules 6, 7 are in each case arranged in each plane 4, 5. A dedicated intermediate shelf 8 is provided under every second energy storage module 7. This intermediate shelf 8 supports the respective second energy storage module 7.

Figure 4:
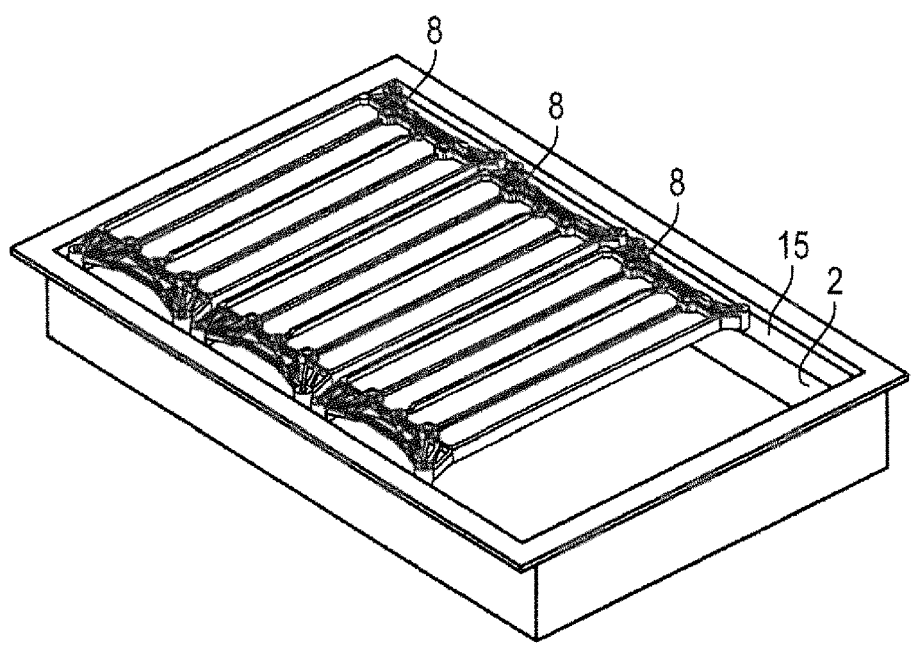
FIG. 4 shows a second detail of the inventive energy storage arrangement according to the exemplary embodiment.
Figure 7:
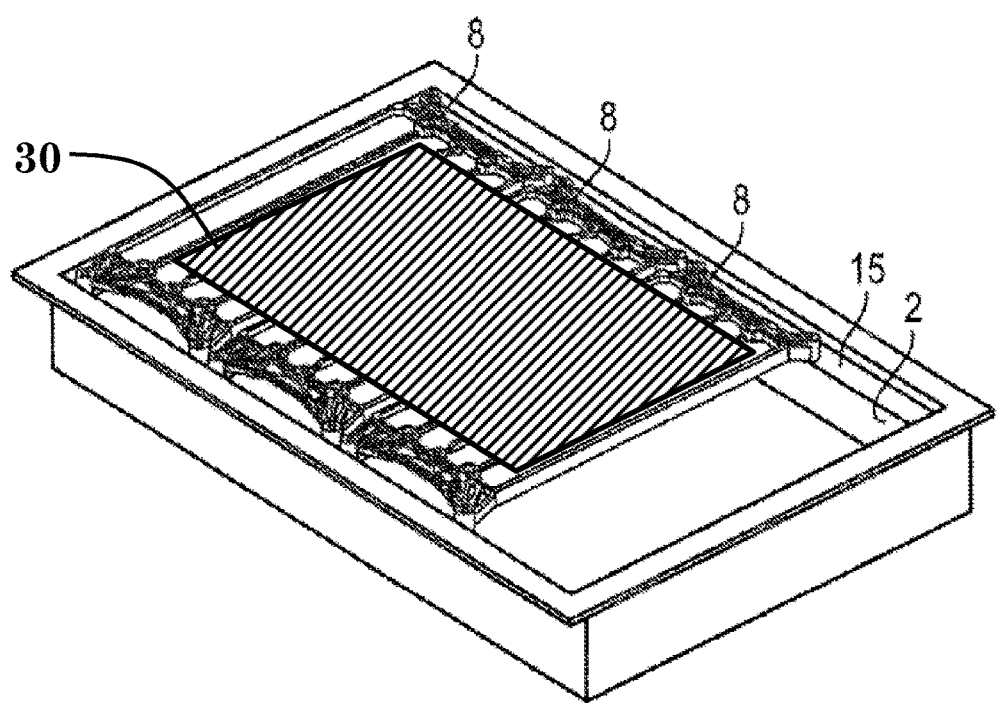
FIG. 7 shows a third detail of the inventive energy storage arrangement of FIG. 4, according to an exemplary embodiment.

FIG. 4 shows the energy storage arrangement 1, wherein the energy storage modules 6, 7 and the cover 3 have been omitted. As a result, only the housing 2 with the three intermediate shelves 8 can be seen in FIG. 4. A plurality of contact areas 15 is shown in the housing 2. The intermediate shelves 8 rest on these contact areas 15 and are screwed to the housing 2. FIG. 7 shows an embodiment of FIG. 4 in which a cooling device 30, in the form of a cooling rib, extends over the three intermediate shelves 8 such that only one common cooling device, in particular with one common cooling rib element, is provided for all second energy storage modules.

Figure 5:
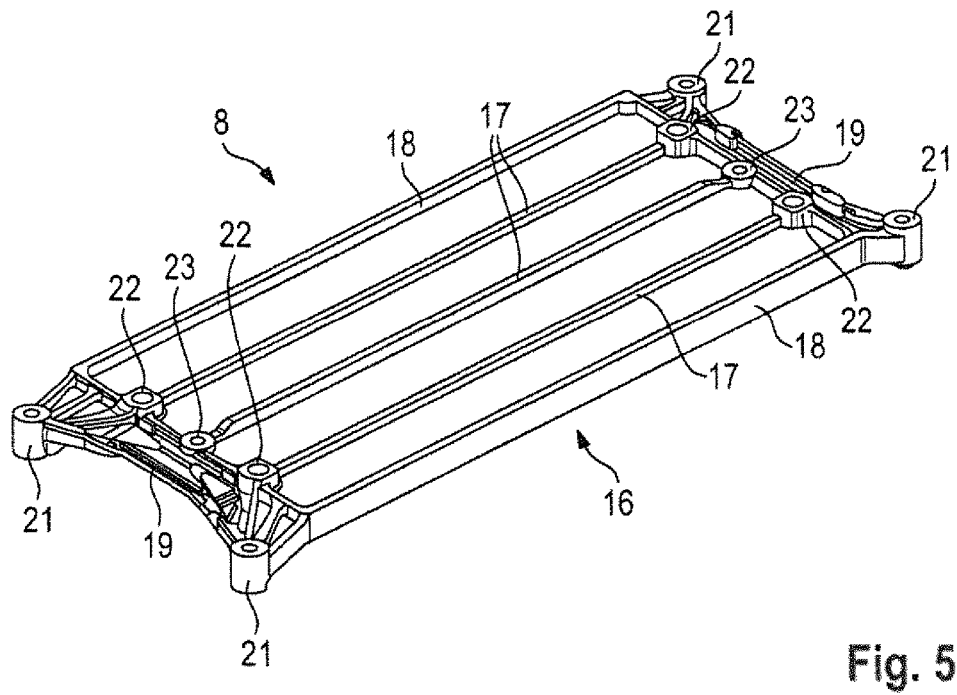
FIG. 5 shows an intermediate shelf of the inventive energy storage arrangement according to the exemplary embodiment.

FIG. 5 shows one of the intermediate shelves 8 in detail. Each intermediate shelf 8 comprises a peripheral frame 16. The frame 16 is in turn made up of two parallel longitudinal struts 18 and two parallel transverse struts 19. The longitudinal struts 18 are perpendicular to the transverse struts 19. Three further struts 17 are inserted parallel to the longitudinal struts 18 in order to stiffen the intermediate shelf 8.

First screw points 21 for screwing the intermediate shelf 8 to the housing 2 are provided on both sides along the transverse struts 19. Second screw points 22 and third screw points 23 are provided between the first screw points 21. The second screw points 22 are used to screw the end plates 9 of the second energy storage modules 7 to the intermediate shelves 8. One of the third screw points 23 is provided on either side between the second screw points 22 in each case. The third screw points 23 are used for positioning a cooling device, which is not shown, to the intermediate shelves 8 by means of a pin.

Figure 6:
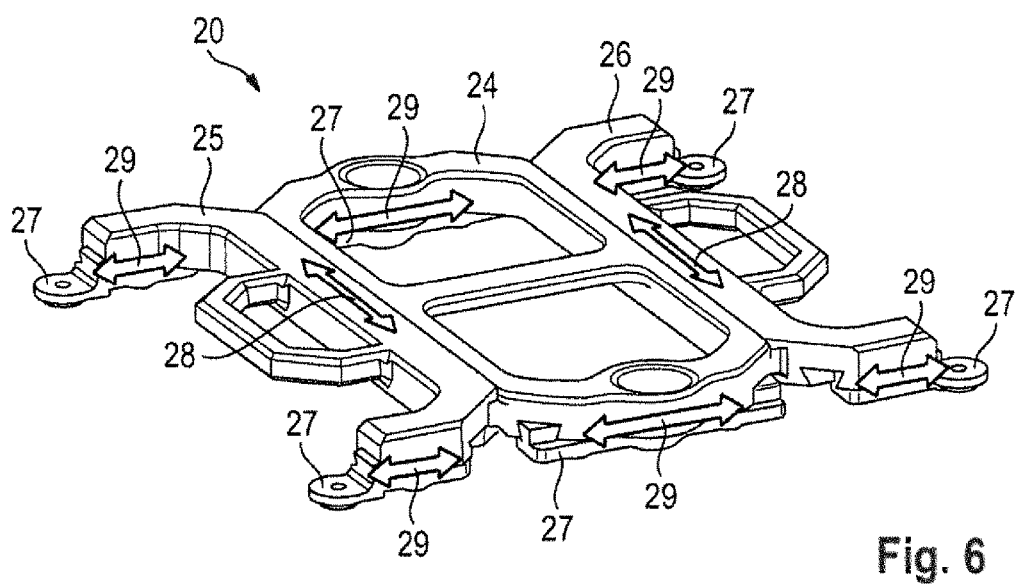
FIG. 6 shows an inventive assembly apparatus according to a further exemplary embodiment.

Furthermore, the third screw points 23 are used for fixing the intermediate shelves 8 to an assembly apparatus 20 (see FIG. 6).

FIG. 6 shows the assembly apparatus 20 for assembling three intermediate shelves 8 in the housing 2.

The assembly apparatus 20 comprises a first holder 24 in the middle and, arranged at the side, a second holder 25 and a third holder 26. The second and third holders 25, 26 are in each case connected to the first holder 24 by means of a rail system. As a result, the two outer holders 25, 26 can be moved relative to the first holder 24 along a first direction 28.

Two mountings 27 are in each case provided on each holder 24-26. The mountings 27 are connected to the respective holder 24-26 by means of a further rail system. As a result, the mountings 27 can be moved relative to the respective holder 24-26 along a second direction 29. The second direction 29 is perpendicular to the first direction 28.

An intermediate shelf 8 is fixed to each holder 24-26 by means of the mountings 27. In doing so, the intermediate shelves 8 are fixed to the mountings 27 by means of the third screw points 23.

The assembly apparatus 20 shown holds the three intermediate shelves 8 exactly parallel to one another during the assembly process. At the same time, the assembly apparatus 20 enables a movement of the intermediate shelves 8 relative to one another in one plane, thus enabling any manufacturing tolerances in the housing 2 to be responded to.

The assembly apparatus 20 enables a parallel alignment of the intermediate shelves 8 relative to one another, which is necessary for the cooling device, in the event that the coarsest possible tolerances of the housing 2 occur simultaneously. The assembly apparatus 20 enables a parallel movement of the intermediate shelves 8 in the two directions 28, 29. As a result, the housing 2 can remain relatively coarse and the holes in the intermediate shelves 8 can be kept small so that the permissible surface pressure is not exceeded. At the same time, a sufficiently large contact area of the cooling device on the intermediate shelf 8 is guaranteed as a result of the accurate positioning of the intermediate shelf 8.

The inventive energy storage arrangement is characterized in that the intermediate shelf 8, which supports the second energy storage module 7, is supported, for example by means of contact areas 15, on the walls, or more accurately, the side walls of the housing 2. I.e. the intermediate shelf 8 is not supported directly by means of appropriately designed supporting elements on the bottommost housing base which supports the first energy storage module 6. Consequently, the forces emanating from the intermediate shelf 8 are not introduced into the bottommost housing base but into the side walls of the housing 2, as a result of which the load acting on the bottommost housing base is reduced.

REFERENCES

1 Energy storage arrangement
2 Housing
3 Cover
4 First plane
5 Second plane
6 First energy storage module
7 Second energy storage module
8 Intermediate shelf
9 End plates
10 Storage cells
11 Tension anchor
12 Through-holes
13, 14 Rows
15 Contact areas
16 Frame
17 Struts
18 Longitudinal struts
19 Transverse struts
20 Assembly apparatus
21-23 Screw points
24 First holder
25 Second holder
26 Third holder
27 Mountings
28 First direction
29 Second direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage arrangement for supplying a voltage of a motor vehicle comprising:
   a housing having a first plane and a second plane lying above the first plane;
   a first energy storage module arranged within said housing in the first plane;
   a second energy storage module arranged within said housing in the second plane; and
   an intermediate shelf arranged within said housing separating the first energy store module in the first plane from the second energy store module in the second plane, wherein the intermediate shelf is fixed to the housing and supports the second energy storage module,
   wherein the first energy storage module comprises two first opposing end plates and a first plurality of storage cells clamped between the two first opposing end plates,
   wherein the second energy storage module comprises two second opposing end plates and a second plurality of storage cells clamped between the two second opposing end plates, and
   wherein the intermediate shelf at least one of comprises a peripheral frame and is screwed to the housing.

2. An energy storage arrangement for supplying a voltage of a motor vehicle comprising:
   a housing having a first plane and a second plane lying above the first plane;
   a first energy storage module arranged within said housing in the first plane;
   a second energy storage module arranged within said housing in the second plane; and
   an intermediate shelf arranged within said housing separating the first energy store module in the first plane from the second energy store module in the second plane, wherein the intermediate shelf is fixed to the housing and supports the second energy storage module, wherein the first energy storage module comprises two first opposing end plates and a first plurality of storage cells clamped between the two first opposing end plates, wherein the second energy storage module comprises two second opposing end plates and a second plurality of storage cells clamped between the two second opposing end plates, and wherein the second energy storage module is connected to the housing by only the intermediate shelf.

3. An energy storage arrangement for supplying a voltage of a motor vehicle comprising:
- a housing having a first plane and a second plane lying above the first plane;
- a first energy storage module arranged within said housing in the first plane;
- a second energy storage module arranged within said housing in the second plane; and
- an intermediate shelf arranged within said housing separating the first energy store module in the first plane from the second energy store module in the second plane, wherein the intermediate shelf is fixed to the housing and supports the second energy storage module, wherein the first energy storage module comprises two first opposing end plates and a first plurality of storage cells clamped between the two first opposing end plates, wherein the second energy storage module comprises two second opposing end plates and a second plurality of storage cells clamped between the two second opposing end plates, and wherein the two second opposing end plates of the second energy storage module rest on and are screwed to the intermediate shelf.

4. The energy storage arrangement as claimed in claim 1, further comprising at least two first energy storage modules arranged in the first plane and at least two second energy storage modules arranged in the second plane, wherein a single dedicated intermediate shelf is arranged under every second energy storage module.

5. The energy storage arrangement as claimed in claim 1, further comprising a cooling device between the intermediate shelf and the second energy storage module.

6. The energy storage arrangement as claimed in claim 4, further comprising a cooling device between the intermediate shelf and the at least two second energy storage modules.

7. The energy storage arrangement as claimed in claim 4, further comprising a cooling rib element that extends over a plurality of intermediate shelves and the at least two second energy storage modules.

8. The energy storage arrangement as claimed in claim 5, wherein the arrangement comprises a plurality of second energy storage modules in the second plane, and wherein the cooling device comprises a cooling rib element that extends over a plurality of intermediate shelves and the plurality of second energy storage modules.

9. The energy storage arrangement as claimed in claim 5, wherein the intermediate shelf presses the cooling device against an underside of the second energy storage module.

10. The energy storage arrangement as claimed in claim 7, wherein the plurality of intermediate shelves press the cooling device against an underside of the at least two second energy storage modules.

11. An assembly apparatus for inserting intermediate shelves in a housing of an energy storage arrangement as claimed in claim 1, comprising:
- a first holder having at least one mounting which is designed for fixing a first intermediate shelf; and
- a second holder which is connected to the first holder and has at least one mounting which is designed for fixing a second intermediate shelf, wherein the second holder can be moved relative to the first holder in a first direction, and wherein the mountings can be moved relative to the holders in a second direction perpendicular to the first direction.

12. The assembly apparatus as claimed in claim 11, further comprising a third holder that is connected to the first holder and has at least one mounting designed for fixing a third intermediate shelf, wherein the third holder can be moved relative to the first holder in the first direction.

13. The energy storage arrangement as claimed in claim 1, wherein the peripheral frame comprises two parallel longitudinal struts and two parallel transverse struts.

14. The energy storage arrangement as claimed in claim 13, wherein the longitudinal struts are perpendicular to the transverse struts.

15. The energy storage arrangement as claimed in claim 13, wherein the peripheral frame comprises a plurality of further struts inserted parallel to the longitudinal struts extending between the two parallel transverse struts.

* * * * *